(12) United States Patent
Anglin et al.

(10) Patent No.: US 8,374,999 B2
(45) Date of Patent: Feb. 12, 2013

(54) DEDUPLICATION OF DATA OBJECT OVER MULTIPLE PASSES

(75) Inventors: Matthew J. Anglin, Tuscon, AZ (US); Colin S. Dawson, Tucson, AZ (US); Howard N. Martin, Vail, AZ (US); Michael G. Sisco, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/830,343

(22) Filed: Jul. 4, 2010

(65) Prior Publication Data

US 2012/0005171 A1 Jan. 5, 2012

(51) Int. Cl.
G06F 17/30 (2006.01)
(52) U.S. Cl. ...................................... 707/610; 707/637
(58) Field of Classification Search .................. 707/610, 707/616, 637, 999.107, 999.202, 999.203, 707/999.204
See application file for complete search history.

(56) References Cited

U.S. PATENT DOCUMENTS

| | | | |
|---|---|---|---|
| 7,401,194 B2 | 7/2008 | Jewell | |
| 7,818,535 B1 * | 10/2010 | Bono et al. | 711/173 |
| 2009/0037495 A1 * | 2/2009 | Kumar et al. | 707/204 |
| 2009/0307251 A1 * | 12/2009 | Heller et al. | 707/101 |
| 2011/0022566 A1 * | 1/2011 | Beaverson et al. | 707/639 |
| 2011/0145523 A1 * | 6/2011 | Gupta et al. | 711/159 |
| 2011/0196833 A1 * | 8/2011 | Drobychev et al. | 707/634 |
| 2011/0246430 A1 * | 10/2011 | Prahlad et al. | 707/679 |
| 2011/0252073 A1 * | 10/2011 | Pauly | 707/812 |
| 2011/0271033 A1 * | 11/2011 | Williams | 711/102 |
| 2011/0296133 A1 * | 12/2011 | Flynn et al. | 711/171 |

* cited by examiner

Primary Examiner — Leslie Wong
(74) Attorney, Agent, or Firm — Feb R. Cabrasawan

(57) ABSTRACT

In each of a number of passes to deduplicate a data object, a transaction is started. Where an offset into the object has previously been set, the offset is retrieved; otherwise, the offset is set to reference a beginning of the object. A portion of the object beginning at the offset is deduplicated until an end-of-transaction criterion has been satisfied. The transaction is ended to commit deduplication; where the object has not yet been completely deduplicated, the offset is moved just past where deduplication has already occurred. The object is locked during each pass; other processes cannot access the object during each pass, but can access the object between passes. Each pass is relatively short, so the length of time in which the object is inaccessible is relatively short. By comparison, deduplicating an object within a single pass prevents other processes from accessing the object for a longer time.

12 Claims, 5 Drawing Sheets

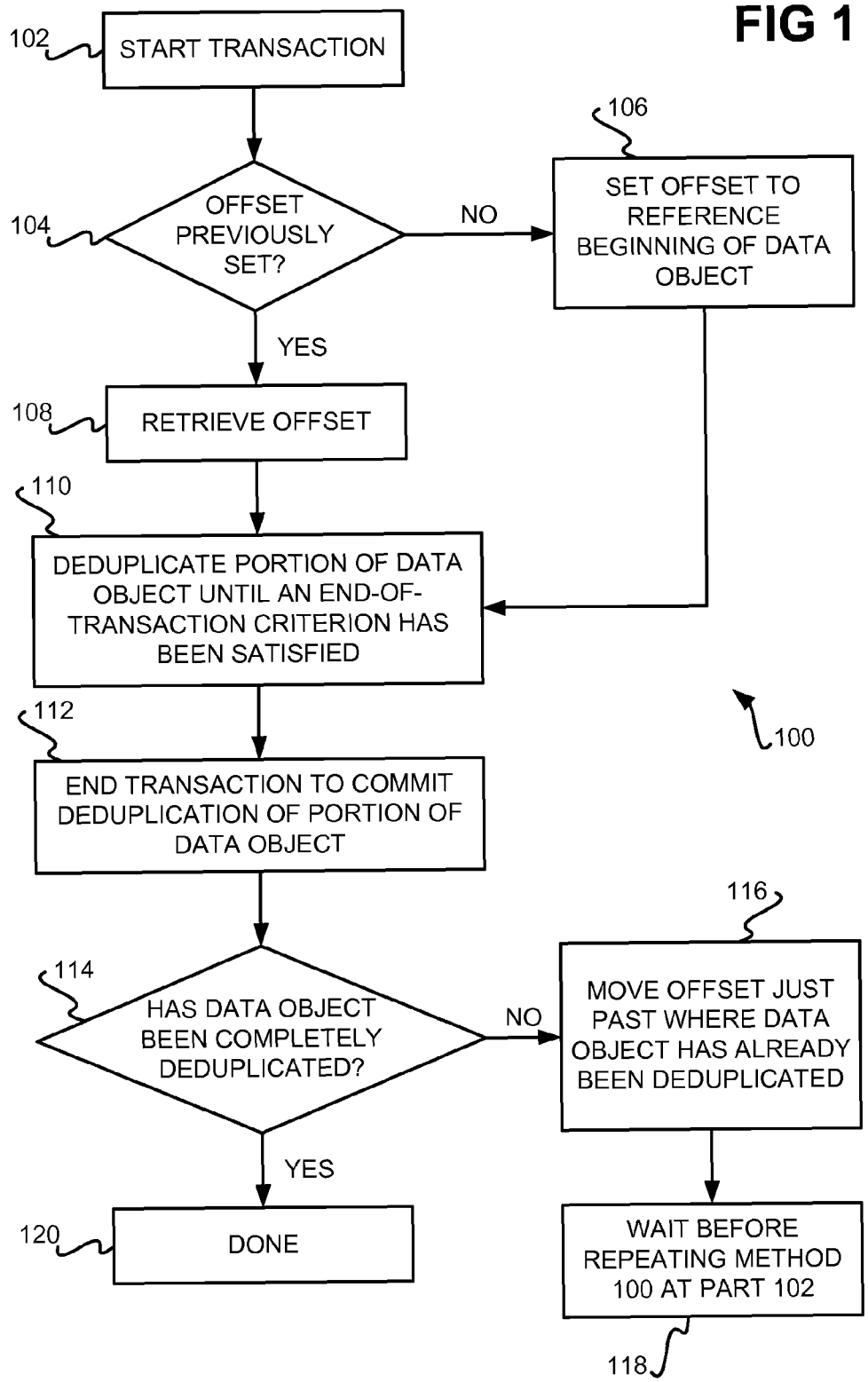

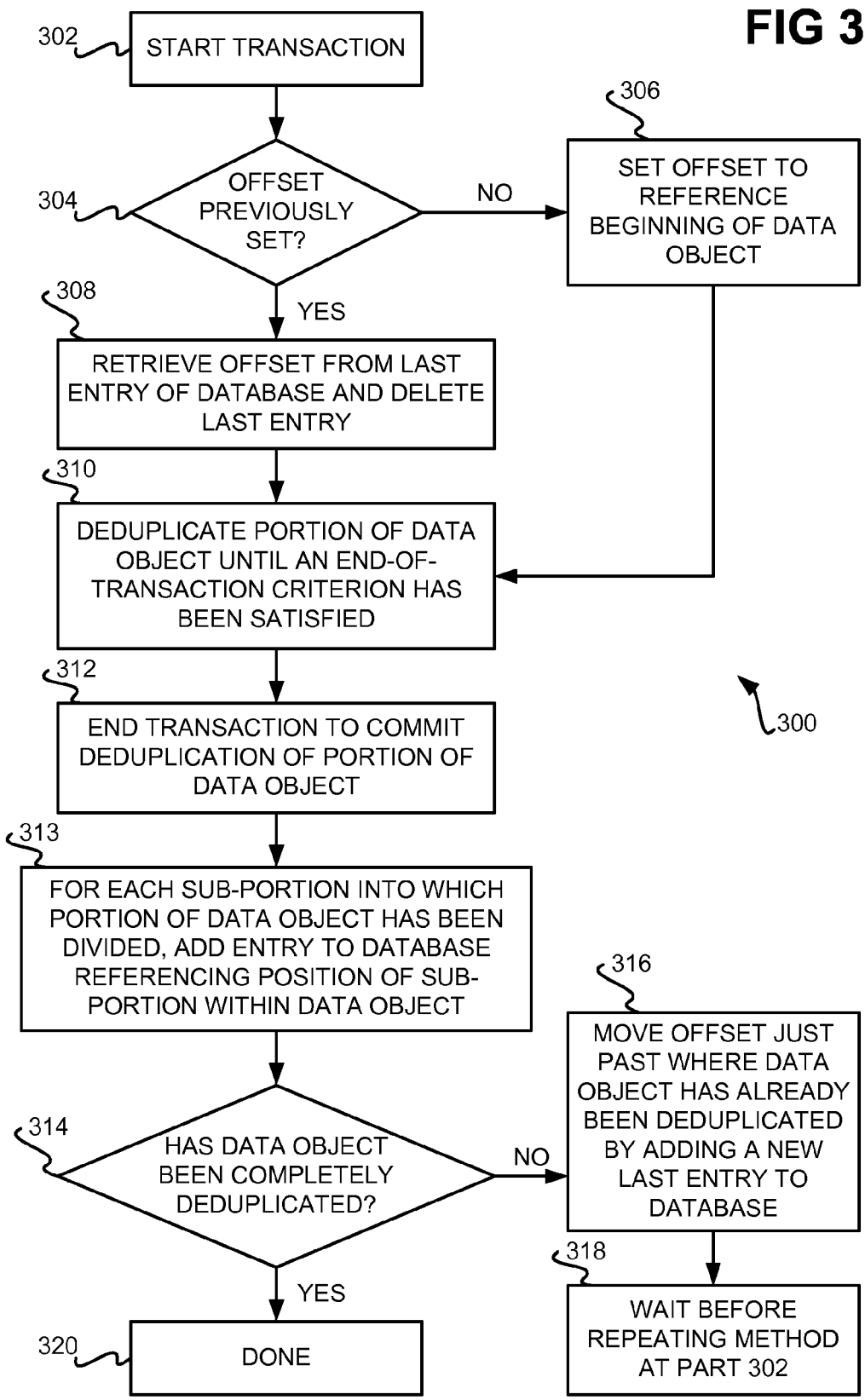

FIG 4A

| NON-DEDUPLICATED? | POSITION | UNIQUE DATA? | DATA SIGNATURE | NON-UNIQUE DATA REFERENCE |
|---|---|---|---|---|
| FALSE | A | TRUE | SIGNATURE A | NULL |
| FALSE | B | TRUE | SIGNATURE B | NULL |
| FALSE | C | TRUE | SIGNATURE C | NULL |
| FALSE | D | FALSE | SIGNATURE B | B |
| FALSE | E | FALSE | SIGNATURE C | C |
| TRUE | F | NULL | NULL | NULL |

| NON-DEDUPLICATED? | POSITION | UNIQUE DATA? | DATA SIGNATURE | NON-UNIQUE DATA REFERENCE |
|---|---|---|---|---|
| FALSE | A | TRUE | SIGNATURE A | NULL |
| FALSE | B | TRUE | SIGNATURE B | NULL |
| FALSE | C | TRUE | SIGNATURE C | NULL |
| FALSE | D | FALSE | SIGNATURE B | B |
| FALSE | E | FALSE | SIGNATURE C | C |
| FALSE | F | FALSE | SIGNATURE C | C |
| FALSE | G | TRUE | SIGNATURE G | NULL |
| FALSE | H | FALSE | SIGNATURE A | A |
| TRUE | I | NULL | NULL | NULL |

| NON-DEDUPLICATED? | POSITION | UNIQUE DATA? | DATA SIGNATURE | NON-UNIQUE DATA REFERENCE |
|---|---|---|---|---|
| FALSE | A | TRUE | SIGNATURE A | NULL |
| FALSE | B | TRUE | SIGNATURE B | NULL |
| FALSE | C | TRUE | SIGNATURE C | NULL |
| FALSE | D | FALSE | SIGNATURE B | B |
| FALSE | E | FALSE | SIGNATURE C | C |
| FALSE | F | FALSE | SIGNATURE C | C |
| FALSE | G | TRUE | SIGNATURE G | NULL |
| FALSE | H | FALSE | SIGNATURE A | A |
| FALSE | I | FALSE | SIGNATURE A | A |
| FALSE | J | FALSE | SIGNATURE G | G |
| FALSE | K | TRUE | SIGNATURE K | NULL |

412, 416, 420

DEDUPLICATION OF DATA OBJECT OVER MULTIPLE PASSES

FIELD OF THE INVENTION

The present invention relates generally to deduplicating a data object, and more particularly to performing a number of passes in order to deduplicate the data object.

BACKGROUND OF THE INVENTION

A single-instance storage algorithm maintains one copy of each unique piece of data, where each such unique piece of data may be shared by multiple users, multiple files, or multiple computing devices. As such, data is stored more efficiently, because there is little or no duplication of stored data. A single-instance storage algorithm may also be referred to as a de-duplication algorithm, insofar as duplicate pieces of data within a large collection of data are eliminated.

Single-instance storage is useful in a variety of contexts, including file systems, email server systems, and data backup systems. For example, a data backup system may be used to back up a large collection of data. Rather than blindly copying the large collection of data, the data backup system may employ a single-instance storage algorithm to detect duplicate pieces of data within the collection of data. Each duplicate piece of data is stored just once, to minimize the storage required for the backup.

SUMMARY OF THE INVENTION

A method of an embodiment of the invention performs a number of passes to deduplicate a data object, by a process being executed by a computing device. Performing each pass includes the following. A transaction is started. Where an offset into the data object has previously been set, the offset into the data object is retrieved; where the offset into the data object has not yet been set, the offset into the data object is set to reference a beginning of the data object. A portion of the data object beginning at the offset into the data object is deduplicated until one of a number of end-of-transaction criteria has been satisfied. The transaction is ended to commit deduplication of the portion of the data object. Where the data object has not yet been completely deduplicated, the offset into the data object is moved just past where the data object has already been deduplicated.

A computer program product includes a computer-readable storage medium having computer-readable code embodied therein. The computer-readable code is executable by a computing device to perform a number of passes to deduplicate a data object. The computer-readable code includes first computer-readable code to start a transaction; to retrieve an offset into the data object where the offset into the data object has previously been set, retrieve the offset into the data object; and, to set the offset into the data object to reference a beginning of the data object where the offset into the data object has not yet been set. The computer-readable code includes second computer-readable code to deduplicate a portion of the data object beginning at the offset into the data object until one of a number of end-of-transaction criteria has been satisfied. The computer-readable code includes third computer-readable code to end the transaction to commit deduplication of the portion of the data object; and, where the data object has not yet been completely deduplicated, to move the offset into the data object just past where the data object has already been deduplicated.

A system of an embodiment of the invention includes a processor, a computer-readable data storage medium to store a data object to be deduplicated, and a deduplication component implemented at least by the processor to deduplicate the data object over a number of passes. Within each pass the deduplication component is to perform the following. A transaction is started. Where an offset into the data object has previously been set, the offset into the data object is retrieved; where the offset into the data object has not yet been set, the offset into the data object is set to reference a beginning of the data object. A portion of the data object beginning at the offset into the data object is deduplicated until one of a number of end-of-transaction criteria has been satisfied. The transaction is ended to commit deduplication of the portion of the data object. Where the data object has not yet been completely deduplicated, the offset into the data object is moved just past where the data object has already been deduplicated.

A system of another embodiment of the invention includes a processor, a computer-readable medium, and a deduplication component. The computer-readable data storage medium is to store a data object to be deduplicated and is also to store a database to represent the data object after the data object has been deduplicated. The deduplication component is implemented at least by the processor to deduplicate the data object and to construct the database over a number of passes.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

FIG. 1 is a flowchart of a method for deduplicating a data object over a number of passes, according to an embodiment of the invention.

FIG. 3 is a flowchart of a method for deduplicating a data object over a number of passes that is consistent with but more detailed than the method of FIG. 1, according to another embodiment of the invention.

FIGS. 4A, 4B, and 4C are diagrams depicting exemplary performance of the method of FIG. 3, according to an embodiment of the invention.

DETAILED DESCRIPTION

Figure 2A:
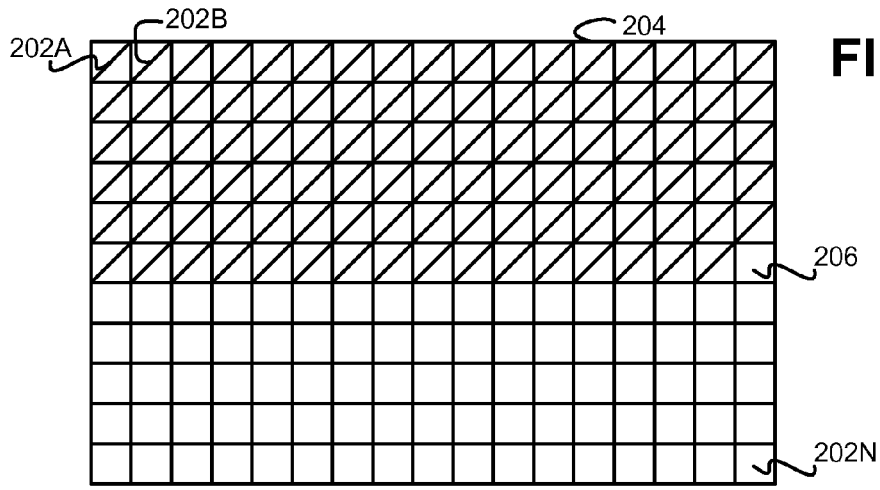
FIGS. 2A, 2B, and 2C are diagrams depicting exemplary performance of the method of FIG. 1, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, single-instance storage algorithms, which are also referred to as deduplication algorithms, are used to maintain just one copy of each unique piece of data to store a given collection of data more efficiently. A deduplication algorithm generally operates by examining a file or other data object to identify repeating patterns of data. One copy of each such pattern of data is still stored, but other copies of the pattern are replaced by references to this stored copy.

Files and other data objects that are subjected to deduplication algorithms can be large, being hundreds of megabytes if not gigabytes or even terabytes in size. As such, deduplicating such a large data object can take time. Problematically, during deduplication a data object is locked by the process performing the deduplication algorithm, and as such other processes cannot access the data object while the object is being deduplicated. This means that deduplication may not be able to be performed as often as desired, because the data object cannot be deduplicated at times when access to the object is required.

Embodiments of the invention provide for a way by which a file or other data object can be deduplicated while still ensuring periodic access to the data object by processes other than the process performing the deduplication algorithm. In particular, the deduplication process is divided into a number of passes, where in each pass just a portion of the data object is deduplicated. Although the data object may be locked by the process performing deduplication during each pass, such that other processes cannot access the data object while the object is being deduplicated, the other processes can access the data object between passes. The number of passes and the period of time between successive passes can be specified so that access to the data object by the other processes is not unduly delayed.

As an example, in one embodiment, deduplicating a hypothetical data object may take one hour. During this time, processes other than the process performing deduplication cannot access the data object, and it may be undesirable to lock out these other processes from the object for this long of time. Therefore, deduplication may be scheduled to occur over ten passes of six minutes each, where fifteen minutes elapse between successive passes. As such, other processes are locked out from accessing the data object for just six minutes at most. While the total time that elapses before deduplication of the data object is completed increases to three hours, fifteen minutes in this example, this delay may be an acceptable tradeoff as compared to not permitting other processes from accessing the data object for an entire hour if deduplication were performed in just a single pass.

FIG. 1 shows a method 100 for deduplicating a data object over a number of passes, according to an embodiment of the invention. The method 100 may be performed by a process being executed by a computing device. The data object may be a file, or another type of data object. A transaction is started (102). The transaction can be an atomic transaction. That is, until the transaction is ended, no part of the transaction is committed. As such, either all parts of the transaction are committed, or no part of the transaction is committed.

If an offset into the data object has not been previously set (104), then the offset is set to reference the beginning of the data object (106). For example, the offset is initially set to zero so that it references the first byte of the data object. If the offset into the data object has been previously set (104), then the offset is retrieved (108). As such, for a given data object, the first pass the method 100 is performed, the offset is set to reference the beginning of the data object, and subsequent passes of the method 100 retrieve the offset.

A portion of the data object beginning at the offset into the data object is deduplicated until an end-of-transaction criterion has been satisfied (110). The manner by which the data object is deduplicated is not limited by embodiments of the invention, and the portion of the data object can be deduplicated in the same manner as is conventionally performed for the data object as a whole. In general, deduplication involves examining the data object beginning at the offset to identify repeating patterns of data. One copy of each such pattern of data is still stored, but other copies of the pattern are replaced by references to this stored copy.

There are at least two different end-of-transaction criteria. One end-of-transaction criterion is that the end of the data object has been encountered or reached. Other end-of-transaction criteria that dictate the end of a pass of the deduplication of a portion of the data object can include the following. A specified number of bytes of the data object may have been deduplicated in the current pass. A specified number of cycles of a processor of a computing device that is executing the process performing the method 100 may have occurred in the current pass. A specified length of time may have elapsed in performing the current pass.

Another end-of-transaction criterion is that the portion of the data object being deduplicated in the current pass may have been divided into a specified number of sub-portions, which can also be referred to as blocks, chunks, extents, or patterns. Each such sub-portion includes unique data of the data object that is not a copy of already deduplicated data, or non-unique data that is a copy of already deduplicated data and that thus can be replaced by a reference to where the non-unique data also resides. As such, this end-of-transaction criterion specifies the number of sub-portions, or blocks, chunks, extents, or patterns, that are to be identified within a given pass of the deduplication of the portion of the data object.

It is noted that in one embodiment, the end-of-transaction criteria are checked in part 110 only after a sub-portion (i.e., a block, chunk, extent, or pattern) has been identified within the object, or if the end of the data object being deduplicated has been reached. That is, the data object is deduplicated in part 110 until a sub-portion has been identified within the object, and at that time the end-of-transaction criteria are checked to see if any criterion has been satisfied. If no criteria have been satisfied, then deduplication of the data object continues until another sub-portion has been identified, and at that time the end-of-transaction criteria are again checked to see if any criterion has been satisfied, and so on. In this embodiment, then, the data object is deduplicated into the same number of sub-portions over a number of iterations of the method 100 than if the data object were deduplicated within a single pass as is conventional.

Once an end-of-transaction criterion has been satisfied, the transaction is ended to commit deduplication of the portion of the data object that has been performed (112). If the data object has not been completely deduplicated (114), the offset is moved to just past where the data object has already been deduplicated and is stored for subsequent retrieval (116); the method 100 is then repeated at part 102 after a specified delay (118). If the data object has been completely deduplicated (114), then the method 100 is finished (120).

In the method 100, the data object is locked by the process performing the method 100 during each pass. That is, once a transaction has been started in part 102, the data object is locked until the transaction has been ended in part 112. While the data object is locked, other processes cannot access the data object. However, these other processes can access the data object in-between passes. As such, part 118 waits for a specified length of time before another pass occurs by repeating the method at part 102, so that these other processes have an opportunity to access the data object before deduplication of the data object continues.

Figure 2B:
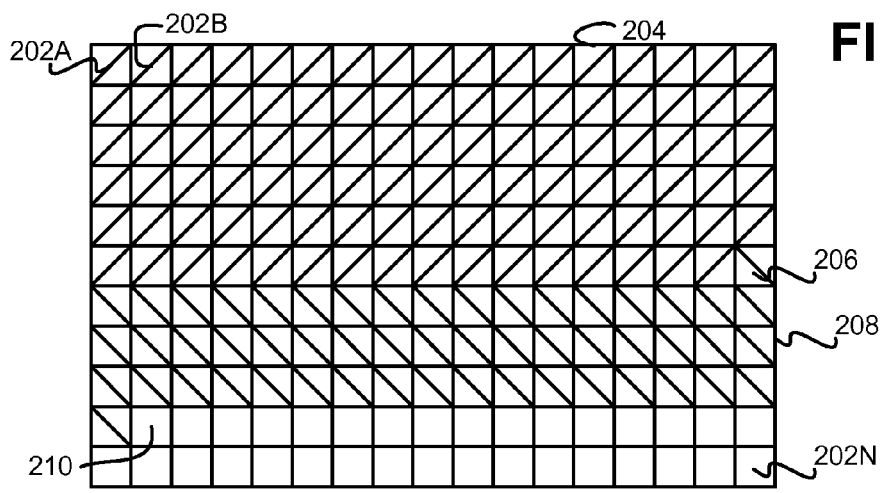
Figure 2C:
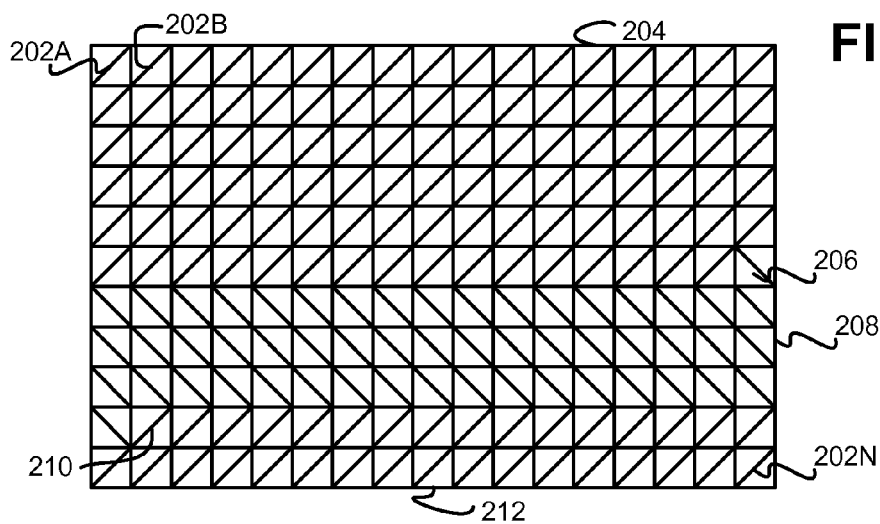

FIGS. 2A, 2B, and 2C illustratively depict representative performance of the method 100 to deduplicate a data object 200 over a number of passes, according to an embodiment of the invention. The data object 200 includes squares 202A, 202B, . . . , 202N, collectively referred to as the squares 202. Each square 202 represents the same number of bytes of the data object 200. For example, each square 202 may represent one byte, one kilobyte, ten kilobytes, and so on, of the data object 200.

In FIG. 2A, when the first pass of deduplication is performed, the offset is set to the square 202A. The data object 200 is deduplicated beginning at the square 202A until an end-of-transaction criterion has been satisfied. In the example of FIG. 2A, this results in the shaded portion 204 of the data object 200 being deduplicated. The offset is moved to the square 202 just past where deduplication of the data object 200 has occurred, which is the square 206.

In FIG. 2B, when the second pass of deduplication is performed, the data object 200 is deduplicated beginning at the square 206 until an end-of-transaction criterion has been satisfied. In the example of FIG. 2B, this results in the shaded portion 208 of the data object being deduplicated. The offset is moved to the square 202 just past where deduplication of the data object 200 has occurred, which is the square 210.

In FIG. 2C, when the third pass of deduplication is performed, the data object 200 is deduplicated beginning at the square 210 until an end-of-transaction criterion has been satisfied, which in the example of FIG. 2C is particularly the end of the data object 200 being reached. As such, this results in the shaded portion 212 of the data object being deduplicated. Therefore, in the example of FIGS. 2A-2C, the data object 200 is deduplicated over three passes.

The portions 204, 208, and 212 of the data object 200 that are deduplicated over three successive deduplication passes are contiguous to one another. In the second pass, deduplication starts within the data object 200 just past where the data object 200 was deduplicated in the first pass. Likewise, in the third pass, deduplication starts within the data object 200 just past where the data object 200 was deduplicated in the second pass.

FIG. 3 shows a method 300 for deduplicating a data object over a number of passes, according to another embodiment of the invention. The method 300 is consistent with but more detailed than the method 100. In particular, the method 300 employs a database. When the data object has been completely deduplicated, the database represents the data object.

A transaction is started (302), as before. If an offset into the data object has not been previously set (304), then the offset is set to reference the beginning of the data object (306), also as before. However, if the offset into the data object has been previously set (304), then the offset is retrieved from the last entry of the database, and this last entry of the database is deleted or removed from the database (308).

The last entry of the database corresponds to an un-deduplicated portion of the data object. At any given time, there is at most just one contiguous portion of the data object that has not yet been deduplicated. This un-deduplicated portion of the data object starts at the offset, and continues through the end off the data object. However, in a given pass of the data object, the un-deduplicated portion may not be completely deduplicated, in which case after such a pass of the data object, the un-deduplicated portion in effect shrinks in size.

A portion of the data object beginning at the offset into the data object is deduplicated until an end-of-transaction criterion has been satisfied (310), as before. It can be said that this portion of the data object is divided into one or more sub-portions, which can also be referred to as blocks, chunks, extents, or patterns. Each such sub-portion includes unique data of the data object that is not a copy of already deduplicated data, or includes non-unique data that is a copy of already deduplicated data that thus can be replaced by a reference to where the non-unique data also resides. It is noted that the sub-portions, blocks, chunks, extents, or patterns are not, however, necessarily of equal size, depending on the specific deduplication algorithm being employed.

Once an end-of-transaction criterion has been satisfied, the transaction is ended to commit deduplication of the portion of the data object that has been performed (312), as before. Furthermore, for each sub-portion, or block, chunk, or pattern, into which this portion of the data object has been divided, an entry is added to the database (313). The entry references the position of the sub-portion within the data object.

If a given sub-portion contains unique data of the data object that is not a copy of already deduplicated data, then the unique data is retained on the computer-readable data storage medium on which the data object is stored. A unique signature or hash that corresponds to this unique data may also be determined and added to the entry in this case. By comparison, if a given sub-portion contains non-unique data that is a copy of already deduplicated data and that thus can be replaced by a reference to where the non-unique data also resides, then this reference is also added to the entry within the database for the sub-portion.

Furthermore, for a given sub-portion that contains non-unique data that is a copy of already deduplicated data, the non-unique data is not retained on the computer-readable data storage medium on which the data object is stored. Rather, this given sub-portion is said to be reclaimed, in that it can now be used to store other data. That is, because the database stores an entry for the given sub-portion that references where a copy of the non-unique data is stored, the actual sub-portion on the computer-readable data storage medium on which the data object is stored does not have to be retained. Rather, this sub-portion can be reclaimed to improve utilization efficiency of the computer-readable data storage medium.

A data object is thus deduplicated in that the data of sub-portions that are copies of data that have already been deduplicated are not retained on the computer-readable data storage medium on which the data object is stored. Rather, references to the already deduplicated data are stored in the database for such sub-portions of the data object. Data of the data object is retained on the computer-readable data storage medium on which the data object is stored just for sub-portions that contain unique data that are not copies of already deduplicated data. The more sub-portions a data object has that include data that are copies of data that have already been deduplicated, the greater the extent to which the data object can be deduplicated.

If the data object has not been completely deduplicated (314), the offset is moved to just past where the data object has already been deduplicated, and a new last entry is added to the database (316); the method 300 is then repeated at part 302 after a specified delay (318). The new last entry corresponds to the un-deduplicated portion of the data object, and references the starting position of the un-deduplicated portion within the data object. This position is subsequently retrieved in the next pass in part 308 as the offset into the data object at which deduplication begins again. Once the data object has been completely deduplicated (314), then the method 300 is finished (320).

FIGS. 4A, 4B, and 4C illustratively depict representative performance of the method 300 to deduplicate the data object 200 of FIGS. 2A, 2B, and 2C over a number of passes by using a database 400, according to an embodiment of the invention. FIGS. 4A, 4B, and 4C show the database 400 after performance of first, second, and third passes, respectively, in correspondence with deduplication of the data object 200 as has been described in relation to FIGS. 2A, 2B, and 2C, respectively. FIG. 4A thus corresponds to FIG. 2A, FIG. 4B corresponds to FIG. 2B, and FIG. 4C corresponds to FIG. 2C.

The database 400 includes fields 402, 404, 406, 408, and 410. The field 402 indicates whether a given entry in the database 400 corresponds to a non-deduplicated portion of the data object 200, where FALSE indicates that the entry does not, and where TRUE indicates that the entry does correspond to a non-deduplication portion of the data object 200. The field 404 indicates a position, or offset, within the data object 200 where a portion or sub-portion of an entry starts. Besides the field 404, the database 400 can also include a field indicating the length of the sub-portion within the data object 200, starting at the position or offset specified by the field 404, of an entry.

The field 406 indicates whether an entry corresponds to a sub-portion containing unique data that is not a copy of already deduplicated data, where TRUE indicates that the entry corresponds to a sub-portion containing unique data, and where FALSE indicates that the entry corresponds to a sub-portion containing non-unique data that is a copy of already deduplicated data. The field 408 includes a data signature, or hash, of the data of a sub-portion of the data object 200. The field 410 includes a reference to where the data of a sub-portion of the data object 200 also resides where an entry corresponds to a sub-portion containing non-unique data that is a copy of already deduplicated data. Otherwise, the field 410 is set to NULL.

FIG. 4A shows the database 400 after the first pass of deduplication in FIG. 2A has been performed. The database 400 includes five entries 412 that correspond to the sub-portions that have been identified as a result of deduplication having been performed on the portion 204 of the data object 200 in FIG. 2A. The field 404 for each entry 412 includes a position within the data object 200 where a corresponding sub-portion starts, where E>D>C>B>A. Each of the first three entries 412 corresponds to a sub-portion that contains unique data that is not a copy of already deduplicated data, and therefore includes a value of TRUE in the field 406 and a corresponding signature in the field 408. The field 410 does not apply to the first three entries 412, and therefore the field 410 for each of the first three entries 412 is set to NULL.

By comparison, each of the last two entries 412 corresponds to a sub-portion of the data object 200 containing non-unique data that is a copy of already deduplicated data, and therefore includes a reference to this data where the data elsewhere resides. For instance, the fourth entry 412 corresponds to a sub-portion that is identical to the sub-portion to which the second entry 412 corresponds. Therefore, the field 410 for the fourth entry 412 includes a reference to the second entry 412, and the field 408 for the fourth entry 412 has the same signature as the field 408 for the second entry 412. Similarly, the fifth entry 412 corresponds to a sub-portion that is identical to the sub-portion to which the third entry 412 corresponds; the field 410 for the fifth entry 412 includes a reference to the third entry 412, and the field 408 for the fifth entry 412 has the same signature as the field 408 for the third entry 412.

The last entry 414 of the database 400 in FIG. 4A corresponds to the non-deduplicated portion of the data object 200 that extends from the square 206 to the square 202N in FIG. 2A. As such, the field 402 for the entry 414 is TRUE, and the position F, which is greater than the position E within the data object 200, corresponds to the square 206 in FIG. 2A. The fields 406, 408, and 410 for the entry 406 are each set to NULL. Because the last entry 414 does not correspond to a deduplication portion of the data object 200, TRUE or FALSE does not apply to the field 406; furthermore, there is no signature to place in the field 408 for the last entry 414.

FIG. 4B shows the database 400 after the second pass of deduplication in FIG. 2B has been performed. The database 400 includes three new entries 416 that correspond to the sub-portions that have been identified as a result of deduplication having been performed on the portion 208 of the data object 200 in FIG. 2B. The field 404 for each entry 416 includes a position within the data object 200 where a corresponding sub-portion starts, where H>G>F. The second entry 416 corresponds to a sub-portion that contains unique data that is not a copy of already deduplicated data, and therefore includes a value of TRUE in the field 406 and a corresponding signature in the field 408, as well as a value of NULL in the field 410.

By comparison, the first and the third entries 416 each correspond to a sub-portion of the data object 200 containing non-unique data that is a copy of already deduplicated data, and therefore includes a reference to this data where the data resides elsewhere. For instance, the first entry 416 corresponds to a sub-portion that is identical to the sub-portion to which the third entry 412 corresponds. Therefore, the field 410 for the first entry 416 includes a reference to the third entry 412, and the field 408 for the first entry 416 has the same signature as the field 408 for the third entry 412. Similarly, the third entry 416 corresponds to a sub-portion that is identical to the sub-portion to which the first entry 412 corresponds; the field 410 for the third entry 416 includes a reference to the first entry 412, and the field 408 for the third entry 416 has the same signature as the field 408 for the first entry 412.

The last entry 418 of the database 400 in FIG. 4A corresponds to the non-deduplicated portion of the data object 200 that extends from the square 210 to the square 202N in FIG. 2B. As such, the field 402 for the entry 418 is TRUE, and the position I, which is greater than the position H within the data object 200, corresponds to the square 210 in FIG. 2B. The fields 406, 408, and 410 for the entry 418 are all set to NULL.

It is noted that when the deduplication pass of FIG. 2B is performed, the last entry 414 of the database 400 in FIG. 4A that resulted from performing the deduplication pass of FIG. 2A is deleted or removed. Furthermore, the first entry 416 added to the database 400 in FIG. 4B has the same position in the field 404 as the last entry 414 in FIG. 4A. This is because the first entry 416 corresponds to the first deduplicated sub-portion of the data object 200 within the second deduplication pass of FIG. 2B, and the second pass starts at the position of the non-deduplicated portion of the data object 200 that remains after the first deduplication pass of FIG. 2A is performed.

FIG. 4C shows the database 400 after the third pass of deduplication in FIG. 2C has been performed, where deduplication of the data object 200 is finished. The database 400 includes three new entries 420 that correspond to the sub-portions that have been identified as a result of deduplication having been performed on the portion 212 of the data object 200 in FIG. 2C. The field 404 for each entry 420 includes a position within the data object 200 where a corresponding sub-portion starts, where K>J>I. The third entry 420 corresponds to a sub-portion that contains unique data that is not a copy of already deduplicated data, and therefore includes a value of TRUE in the field 406 and a corresponding signature in the field 408, as well as a value of NULL in the field 410.

By comparison, the first and the second entries 420 each correspond to a sub-portion of the data object 200 containing non-unique data that is a copy of already deduplicated data, and therefore includes a reference to this data where the data resides elsewhere. For instance, the first entry 420 corresponds to a sub-portion that is identical to the sub-portion to which the first entry 412 corresponds. Therefore, the field 410 for the first entry 420 includes a reference to the first entry 412, and the field 408 for the first entry 420 has the same signature as the field 408 for the first entry 412. Similarly, the second entry 420 corresponds to a sub-portion that is identical to the sub-portion to which the second entry 416 corresponds; the field 410 for the second entry 420 includes a reference to the second entry 416, and the field 408 for the second entry 420 has the same signature as the field 408 for the second entry 416.

It is noted that when the deduplication pass of FIG. 2C is performed, the last entry 418 of the database 400 in FIG. 4B that resulted from performing the deduplication pass of FIG. 2B is deleted or removed. Furthermore, the first entry 420 added to the database 400 in FIG. 4C has the same position in the field 404 as the last entry 418 in FIG. 4B. This is because the first entry 420 corresponds to the first deduplicated sub-portion of the data object 200 within the third deduplication pass of FIG. 2B, and the third pass starts at the position of the non-deduplicated portion of the data object 200 that remains after the second deduplication pass of FIG. 2B is performed.

The database 400 in FIG. 4C represents the data object 200 after deduplication of the data object 200 has been completed. The sub-portions of the data object 200 that contain non-unique data that are copies of already deduplicated data can be deleted and reclaimed on the computer-readable data storage medium on which the data object 200 is stored. Subsequent access to the data object 200 can be accomplished using the database 400.

This is because the database 400 stores a deduplicated version of the data object 200, in that sub-portions of the data object 200 that contain non-unique data that are copies of already deduplicated data are represented by references within the database 400 to where such deduplicated data also resides. Even though such sub-portions of the data object 200 are deleted from the computer-readable data storage medium on which the data object 200 is stored, these sub-portions are effectively retained in the database 400. The entries included in the database 400 for these sub-portions reference where copies of the already deduplicated data to which the sub-portions correspond are still stored.

In FIG. 4C, then, there are eleven entries 412, 416, and 420 in total, corresponding to eleven sub-portions of the data object 200. Of these eleven sub-portions, the six sub-portions contain non-NULL values within the field 410 for their corresponding entries 412, 416, and 420, and thus are duplicates of other sub-portions. Therefore, assuming that each sub-portion has the same size, the storage space requirements for the data object 200 have been reduced by about 55%, which results from dividing the number of the sub-portions that are duplicates of other sub-portions (six), by the total number of sub-portions within the data object (eleven).

In the example of FIGS. 4A-4C, a data object has been deduplicated by having each sub-portion within the data object that is a duplicate of another sub-portion within the data object effectively replaced with a reference to the latter sub-portion. That is, a sub-portion B of the data object that is a duplicate of a sub-portion A of the data object is effectively replaced with a reference to the sub-portion A. However, more generally, a sub-portion within a data object that is a duplicate of another sub-portion with any other data object that has already been deduplicated is effectively replaced with a reference to the latter sub-portion. For example, a sub-portion B of a first data object that is a duplicate of a sub-portion A of a second data object is effectively replaced within a reference to the sub-portion A, even though the sub-portion A resides within a different data object than the sub-portion B.

Figure 5:
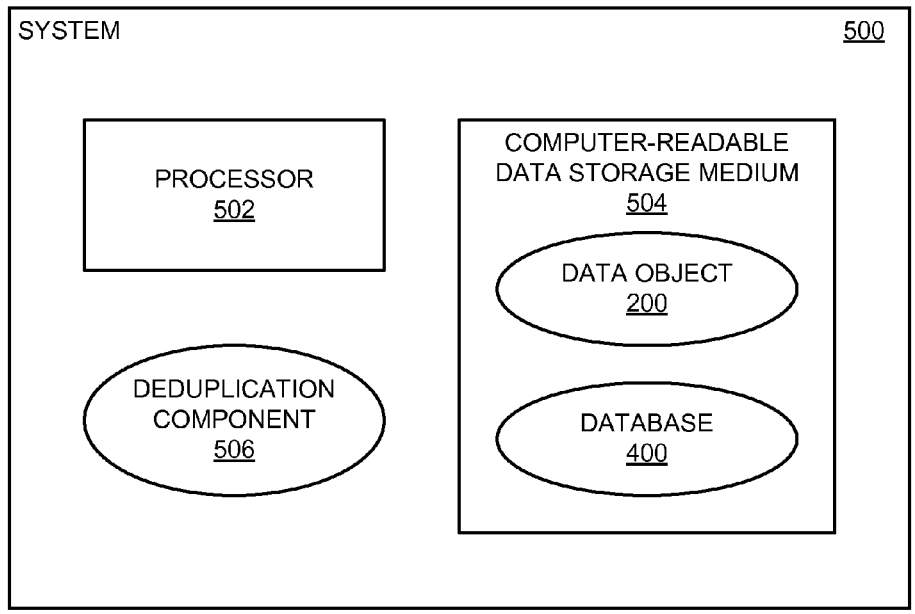
FIG. 5 is a diagram of a representative system, according to an embodiment of the invention.

FIG. 5 shows a representative system 500, according to an embodiment of the invention. The system 500 can be implemented over one or more computing devices. The system 500 includes a processor 502, a computer-readable data storage medium 504, and a deduplication component 506. The computer-readable data storage medium 504 may be a non-volatile data storage medium such as a hard disk drive, a volatile data storage medium such as a volatile semiconductor memory, and/or another type of computer-readable data storage medium. The deduplication component 506 is implemented by the processor 502. For example, the deduplication component 506 may be or include one or more computer programs stored on the computer-readable data storage medium 504 and that are executed by the processor 502.

The computer-readable data storage medium 504 stores a data object 200 to be deduplicated, and can also store the database 400 that represents the data object 200 after the data object 200 has been deduplicated. The deduplication component 506 deduplicates the data object 200, such as by performing the methods 100 and/or 300. Where the deduplication component 506 performs the method 300, which results in the component 506 generating the database 400, sub-portions of the data object 200 that contain non-unique data that are copies of already deduplicated data can be deleted from the original copy of the data object 200 stored on the computer-readable data storage medium 504 after deduplication has been completed.

Figure 6:
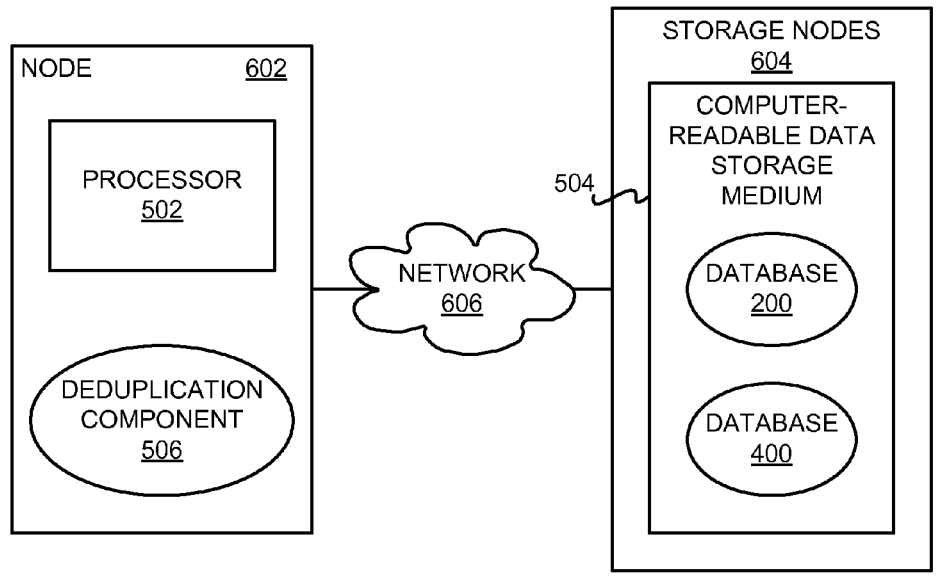
FIG. 6 is a diagram of a representative system, according to another embodiment of the invention.

FIG. 6 shows the representative system 500, according to another embodiment of the invention. The system 500 in FIG. 6 includes a node 602 communicatively interconnected to one or more storage nodes 604 over a network 606. The node 602 may be a computing device, such as a server computing device. The storage nodes 604 may include any combination of magnetic, solid-state, and other types of storage devices. The storage devices 604 may be organized and/or implemented as a storage-area network (SAN), as one or more storage clusters, as a network-attached storage (NAS) device, as a redundant array of independent disks (RAID), and/or in another manner. The network 606 may be or include a local-area network (LAN), a wide-area network (WAN), an intranet, an extranet, the Internet, and so on.

In the embodiment of FIG. 6, the node 602 includes the processor 502 that implements the deduplication component 506, such that the node 602 is said to include the deduplication component 506. That is, the node 602 is the node that performs deduplication as has been described. By comparison, the storage nodes 604 include the computer-readable data storage medium 504 that stores the data object 200 that is to be deduplicated. As such, FIG. 6 shows that deduplication may be performed by a node 602 that is different than and separate from the storage nodes 604 on which the data object 200 to be deduplicated is stored. In the example of FIG. 6, the database 400 is depicted as being stored on the storage nodes 604 as well, but in another embodiment, the database 400 may be stored elsewhere, such as but not limited to the node 602.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising performing a plurality of passes to deduplicate a data object, by a process being executed by a computing device, wherein performing each pass comprises:
   starting a transaction;
   where an offset into the data object has previously been set, retrieving the offset into the data object;
   where the offset into the data object has not yet been set, setting the offset into the data object to reference a beginning of the data object;
   deduplicating a portion of the data object beginning at the offset into the data object until one of a plurality of end-of-transaction criteria has been satisfied;
   ending the transaction to commit deduplication of the portion of the data object; and,
   where the data object has not yet been completely deduplicated, moving the offset into the data object just past where the data object has already been deduplicated,
   wherein retrieving the offset into the data object comprises:
      retrieving the offset from a last entry of a database, the last entry corresponding to an un-deduplicated portion of the data object; and,
      deleting the last entry of the database,
   wherein moving the offset into the data object just past where the data object has already been deduplicated comprises:
   adding a new last entry to the database, the new last entry corresponding to the un-deduplicated portion of the data object and referencing a position of the un-deduplicated portion within the data object,
   and wherein the position of the un-deduplicated portion within the data object corresponds to the offset.

2. The method of claim 1, wherein the data object is locked by the process during each pass such that other processes cannot access the data object during each pass,
   and wherein the other processes access the data object between the passes.

3. The method of claim 1, wherein deduplicating the portion of the data object beginning at the offset into the data object until an end-of-transaction criteria has been satisfied comprises:
   dividing the portion of the data object into one or more sub-portions, each sub-portion containing one of: unique data that is not a copy of already deduplicated data; and, non-unique data that is a copy of already deduplicated data and that can be replaced by a reference to where the non-unique data also resides.

4. The method of claim 3, further comprising, upon the end-of-transaction criteria having been satisfied, for each sub-portion:
   adding an entry to the database, the entry referencing a position of the sub-portion within the data object; and,
   where the sub-portion contains non-unique data that is a copy of already deduplicated data, adding the reference to where the non-unique data also resides to the entry of the database.

5. The method of claim 4, wherein after the data object has been completely deduplicated, the database represents the data object such that the sub-portions of the data object containing non-unique data that are copies of already deduplicated data can be can be deleted from an original copy of the data object stored on a computer-readable data storage medium while still permitting the data object to be accessed via the database.

6. The method of claim 1, wherein the end-of-transaction criteria comprise:
   an end of the data object having been reached; and,
   one or more additional criteria selected from:
      a specified number of bytes of the data object having been deduplicated;
      the portion of the data object having been divided into a specified number of sub-portions, each sub-portion containing one of: unique data that is not a copy of already deduplicated data; and, non-unique data that is a copy of already deduplicated data and that can be replaced by a reference to where the non-unique data also resides;
      a specified number of cycles of a processor of the computing device that is executing the process having occurred; and,
      a specified length of time having elapsed.

7. A computer program product comprising:
   a non-transitory computer-readable storage medium having computer-readable code embodied therein, the computer-readable code executable by a computing device to perform a plurality of passes to deduplicate a data object, the computer-readable code comprising:
   first computer-readable code to:
      start a transaction;
      where an offset into the data object has previously been set, retrieve the offset into the data object;
      where the offset into the data object has not yet been set, set the offset into the data object to reference a beginning of the data object;
   second computer-readable code to deduplicate a portion of the data object beginning at the offset into the data object until one of a plurality of end-of-transaction criteria has been satisfied; and,
   third computer-readable code to:
      end the transaction to commit deduplication of the portion of the data object;
      where the data object has not yet been completely deduplicated, move the offset into the data object just past where the data object has already been deduplicated,
   wherein the first computer-readable code is to retrieve the offset into the data object by:
      retrieving the offset from a last entry of a database, the last entry corresponding an un-deduplicated portion of the data object; and,
      deleting the last entry of the database,
   wherein the third computer-readable code is to move the offset into the data object just past where the data object has already been deduplicated by:
      adding a new last entry to the database, the new last entry corresponding to the un-deduplicated portion of the data object and referencing a position of the un-deduplicated portion within the data object,
   and wherein the position of the un-deduplicated portion within the data object corresponds to the offset.

8. The computer-program product of claim 7, wherein the second computer-readable code is to deduplicate the portion of the data object beginning at the offset into the data object until an end-of-transaction criteria has been satisfied by:
   dividing the portion of the data object into one or more sub-portions, each sub-portion containing one of: unique data that is not a copy of already deduplicated data; and, non-unique data that is a copy of already deduplicated data and that can be replaced by a reference to where the non-unique data also resides, and wherein the third computer-readable code is further to, upon the end-of-transaction criteria having been satisfied, for each sub-portion:
  add an entry to the database, the entry referencing a position of the sub-portion within the data object; and,
  where the sub-portion contains non-unique data that is a copy of already deduplicated data, add the reference to where the non-unique data also resides to the entry of the database.

9. The computer-program product of claim 7, wherein the end-of-transaction criteria comprise:
  an end of the data object having been reached; and,
  one or more additional criteria selected from:
    a specified number of bytes of the data object having been deduplicated;
    the portion of the data object having been divided into a specified number of sub-portions, each sub-portion containing one of: unique data that is not a copy of already deduplicated data; and, non-unique data that is a copy of already deduplicated data and that can be replaced by a reference to where the non-unique data also resides;
    a specified number of cycles of a processor of the computing device that is executing the process having occurred; and,
    a specified length of time having elapsed.

10. A system comprising:
  a processor;
  a non-transitory computer-readable data storage medium to store a data object to be deduplicated;
  a deduplication component implemented at least by the processor to deduplicate the data object over a plurality of passes, wherein within each pass the deduplication component is to:
    start a transaction;
    where an offset into the data object has previously been set, retrieve the offset into the data object;
    where the offset into the data object has not yet been set, set the offset into the data object to reference a beginning of the data object;
    deduplicate a portion of the data object beginning at the offset into the data object until one of a plurality of end-of-transaction criteria has been satisfied;
    end the transaction to commit deduplication of the portion of the data object; and,
    where the data object has not yet been completely deduplicated, move the offset into the data object just past where the data object has already been deduplicated,
  wherein the computer-readable data storage medium is further to store a database and wherein the deduplication component is to retrieve the offset into the data object by:
    retrieving the offset from a last entry of the database, the last entry corresponding to an un-deduplicated portion of the data object; and,
    deleting the last entry of the database,
  wherein the deduplication component is to move the offset into the data object just past where the data object has already been deduplicated by:
    adding a new last entry to the database, the new last entry corresponding to the un-deduplicated portion of the data object and referencing a position of the un-deduplicated portion within the data object,
  and wherein the position of the un-deduplicated portion within the data object corresponds to the offset.

11. The system of claim 10, wherein the deduplication component is to deduplicate the portion of the data object beginning at the offset into the data object until an end-of-transaction criteria has been satisfied by:
  dividing the portion of the data object into one or more sub-portions, each sub-portion containing one of: unique data that is not a copy of already deduplicated data; and, non-unique data that is a copy of already deduplicated data and that can be replaced by a reference to where the non-unique data also resides,
  and wherein the deduplication component is further to, upon the end-of-transaction criteria having been satisfied, for each sub-portion:
    add an entry to the database, the entry referencing a position of the sub-portion within the data object; and,
    where the sub-portion contains non-unique data that is a copy of already deduplicated data, add the reference to where the non-unique data also resides to the entry of the database.

12. The system of claim 10, wherein the end-of-transaction criteria comprise:
  an end of the data object having been reached; and,
  one or more additional criteria selected from:
    a specified number of bytes of the data object having been deduplicated;
    the portion of the data object having been divided into a specified number of sub-portions, each sub-portion containing one of: unique data that is not a copy of already deduplicated data; and, non-unique data that is a copy of already deduplicated data and that can be replaced by a reference to where the non-unique data also resides;
    a specified number of cycles of a processor of the computing device that is executing the process having occurred; and,
    a specified length of time having elapsed.

* * * * *